United States Patent
Hauzenberger et al.

(10) Patent No.: US 9,512,496 B2
(45) Date of Patent: Dec. 6, 2016

(54) METHOD AND DEVICE FOR INTRODUCING FINE PARTICLE-SHAPED MATERIAL INTO THE FLUIDISED BED OF A FLUIDISED BED REDUCTION UNIT

(71) Applicant: PRIMETALS TECHNOLOGIES AUSTRIA GMBH, Linz (AT)

(72) Inventors: Franz Hauzenberger, Linz (AT); Robert Millner, Loosdorf (AT); Jan-Friedemann Plaul, Linz (AT); Norbert Rein, Vienna (AT)

(73) Assignee: PRIMETALS TECHNOLOGIES AUSTRIA GMBH (AT)

( * ) Notice: Subject to any disclaimer, the term of this patent is extended or adjusted under 35 U.S.C. 154(b) by 109 days.

(21) Appl. No.: 14/401,461

(22) PCT Filed: Apr. 4, 2013

(86) PCT No.: PCT/EP2013/057121
§ 371 (c)(1),
(2) Date: Nov. 14, 2014

(87) PCT Pub. No.: WO2013/171001
PCT Pub. Date: Nov. 21, 2013

(65) Prior Publication Data
US 2015/0135899 A1    May 21, 2015

(30) Foreign Application Priority Data
May 16, 2012   (EP) ...................................... 12168157

(51) Int. Cl.
C22B 1/14        (2006.01)
C21B 13/00       (2006.01)
(Continued)

(52) U.S. Cl.
CPC ............ *C21B 13/0033* (2013.01); *C21B 7/002* (2013.01); *C21B 7/22* (2013.01); *C21B 11/00* (2013.01);
(Continued)

(58) Field of Classification Search
CPC .... C21B 13/0033; C21B 13/0026; C21B 1/14; C22B 1/14

See application file for complete search history.

(56) References Cited

U.S. PATENT DOCUMENTS 2,688,478 A    9/1954  Lykken
6,454,833 B1 *  9/2002  Nagl ..................... C21B 13/002
                                                 266/172

(Continued)

FOREIGN PATENT DOCUMENTS

DE    1086256    8/1960
DE    1154817    9/1963
(Continued)

OTHER PUBLICATIONS

DE 1086256B published Aug. 1990. Machine translation of the description.*

(Continued)

*Primary Examiner* — George Wyszomierski
*Assistant Examiner* — Tima M McGuthry Banks
(74) *Attorney, Agent, or Firm* — Ostrolenk Faber LLP

(57) ABSTRACT

A method for introducing fine particulate material (4) of ferruginous particles into a fluidized bed reduction unit (1) having a fluidized bed (24), wherein the temperature in the fluidized bed (24) is more than 300° C., and wherein the fine particulate material (4) is introduced directly into the fluidized bed (24) and/or into a free space (25) above the fluidized bed (24) by means of a burner (2). The method may be used for producing liquid pig iron (17) or liquid steel (Continued)

precursor products (18) by a smelting reduction process in a smelting reduction unit (22).

19 Claims, 3 Drawing Sheets

(51) Int. Cl.
   C21B 7/00        (2006.01)
   C21B 7/22        (2006.01)
   C21B 13/02       (2006.01)
   C21B 13/14       (2006.01)
   F27B 15/14       (2006.01)
   F27B 15/18       (2006.01)
   F27D 1/18        (2006.01)
   F27D 3/18        (2006.01)
   C21B 11/00       (2006.01)

(52) U.S. Cl.
   CPC ....... *C21B 13/0013* (2013.01); *C21B 13/0026* (2013.01); *C21B 13/023* (2013.01); *C21B 13/14* (2013.01); *C21B 13/143* (2013.01); *C22B 1/14* (2013.01); *F27B 15/14* (2013.01); *F27B 15/18* (2013.01); *F27D 1/18* (2013.01); *F27D 3/18* (2013.01); *Y02P 10/122* (2015.11); *Y02P 10/126* (2015.11); *Y02P 10/128* (2015.11); *Y02P 10/136* (2015.11); *Y02P 10/143* (2015.11)

(56) References Cited

U.S. PATENT DOCUMENTS

| | | | |
|---|---|---|---|
| 2012/0200012 A1* | 8/2012 | Sipila | F27D 3/16 266/44 |
| 2012/0228811 A1 | 9/2012 | Sipilä | |
| 2015/0135899 A1* | 5/2015 | Hauzenberger | C21B 7/002 75/446 |

FOREIGN PATENT DOCUMENTS

| | | | |
|---|---|---|---|
| GB | 882909 | 11/1961 | |
| GB | 1101199 A * | 1/1968 | ......... C21B 13/0033 |
| RU | 2192475 C2 | 11/2002 | |
| WO | WO 97/48825 | 12/1997 | |
| WO | WO 98/02586 | 1/1998 | |
| WO | WO 98/15661 | 4/1998 | |
| WO | WO 98/21371 A1 | 5/1998 | |
| WO | WO 02/088401 | 11/2002 | |
| WO | WO 2006107256 A1 * | 10/2006 | ............... B22F 9/08 |
| WO | WO 2011/048263 A1 | 4/2011 | |

OTHER PUBLICATIONS

International Search Report dated May 21, 2013 issued in corresponding International patent application No. PCT/EP2013/057121.
Ukrainian Notice of Allowance, dated Sep. 21, 2016, issued in corresponding Ukrainian Patent Application No. a2014 12294. Total 5 pages.

* cited by examiner

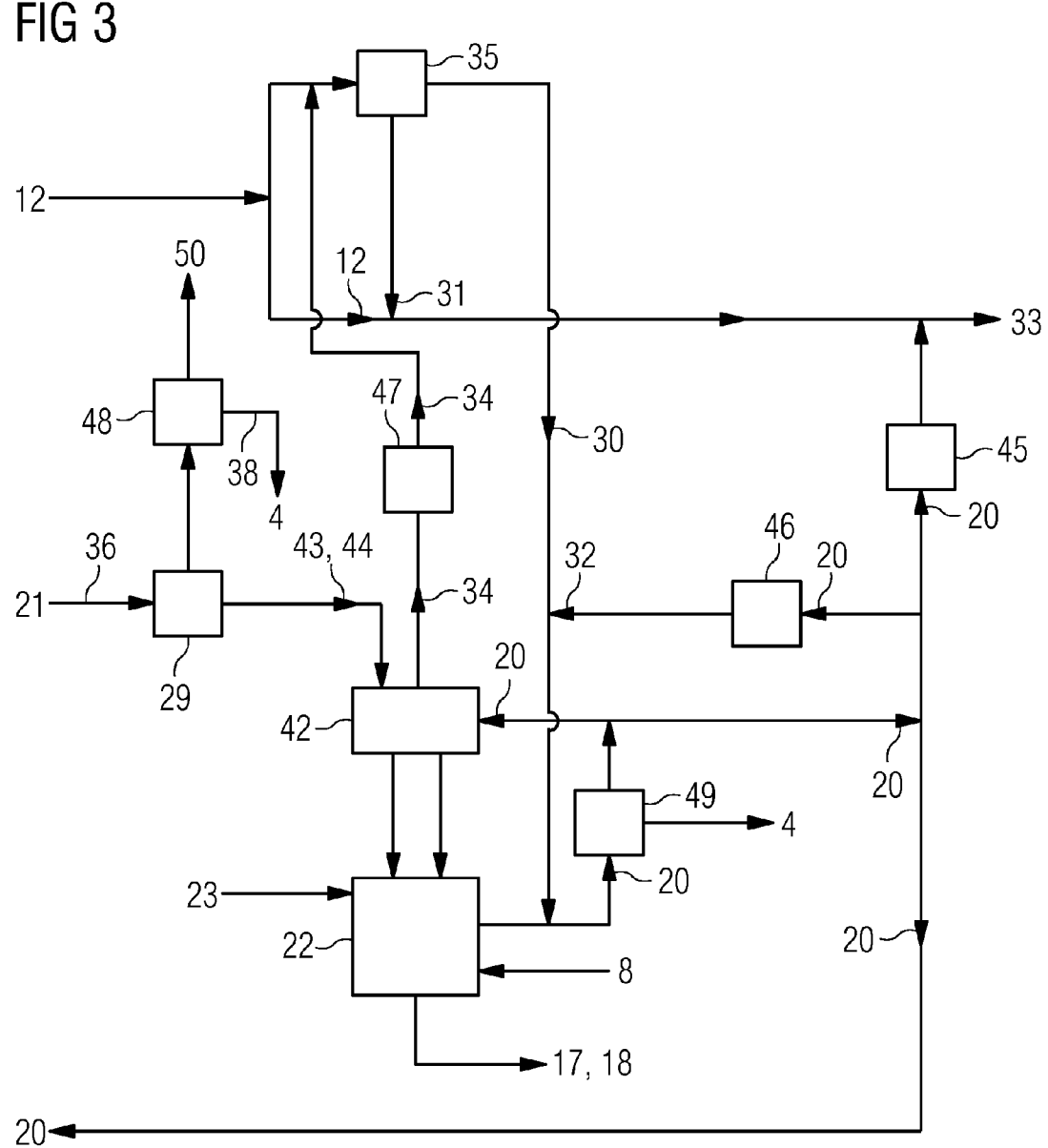

US 9,512,496 B2

METHOD AND DEVICE FOR INTRODUCING FINE PARTICLE-SHAPED MATERIAL INTO THE FLUIDISED BED OF A FLUIDISED BED REDUCTION UNIT

CROSS-REFERENCE TO RELATED APPLICATIONS

The present application is a 35 U.S.C. §§371 National Phase conversion of PCT/EP2013/057121, filed Apr. 4, 2013, which claims priority of European Patent Application No. 12168157.1, filed May 16, 2012, the contents of which are incorporated by reference herein. The PCT International Application was published in the German language.

TECHNICAL FIELD

The invention relates to a method for introducing fine particulate material containing iron-oxide-containing particles into a fluidized bed reduction unit by means of a burner, wherein a partial quantity of the fine particulate material possibly comes from dedusting devices. The invention further relates to the use of the inventive method for producing liquid pig iron or liquid steel intermediate products by means of a smelting reduction process in a smelting reduction unit.

BACKGROUND ART

In a pig iron production process, different process gases such as offgas from a fluidized bed reduction unit or from a packed bed reduction unit are evolved which need to have entrained solid particles largely removed before being re-used or released into the environment. This takes place in dedusting devices, particularly in dry dedusting devices, wherein the solid particles separated out during dedusting often contain iron or iron compounds which for economic and environmental protection reasons are fed back into the pig iron production process.

For example, in the course of the FINEX® pig iron production process, dedusting of the FINEX® offgas by means of bag filters or hot gas filters produces a dust mass every hour which corresponds to around 2% of the mass of the hourly fine ore charge. The amount of iron contained in this resulting dust mass and/or of iron compounds contained this resulting dust mass is approximately 65%. The amount of carbon contained in this resulting dust mass and/or of carbon compounds contained this resulting dust mass is approximately 6%.

Immediately returning these partly pre-reduced solid particles to a fluidized bed reduction unit, wherein the solid particles are fed back into the fluidized bed reduction unit without prior agglomeration to agglomerates, is problematic in that the grain size of the solid particles is too small—a typical grain size distribution $D_{50}$ of such solid particles is between 6 and 9 μm—which would result in immediate discharging of the introduced solid particles from the fluidized bed reduction unit. For this reason, according to the prior art the solid particles are normally consolidated into larger entities, in particular agglomerated, prior to introduction into the fluidized bed reduction unit. This agglomeration takes place using separate agglomerating devices. The solid particles are fed into the agglomerating device where they are formed into agglomerates. These agglomerates are then introduced into the fluidized bed reduction unit using suitable charging devices. The disadvantage of this is that separate agglomerating devices are required, which require a large amount of space and the operation of which creates additional costs.

DE 1154817 describes a method of reducing iron ore involving the introduction of finely comminuted iron ore, fluxing agent, fuel, oxygen and/or air into a reaction chamber by means of burners, wherein the reaction chamber is implemented as a smelting furnace. By means of a [ . . . ] mounted in the dome area of the reaction chamber and having its axis perpendicular to the surface of a bath of molten iron and molten slag present in the reaction chamber, the finely comminuted iron ore is fed directly to this surface.

Similarly to DE 1154817, U.S. Pat. No. 2,688,478 discloses a reducing/smelting furnace for reducing and smelting down iron ore as well as producing gas and energy. By means of inlets mounted on the underside of the smelting furnace and just above the molten bath and having their longitudinal axes extending in the direction of the bath surface and into the bath, fine ore and possibly additives are blown into the smelting furnace using an oxygen-containing gas, wherein the injected material is blown directly onto the bath surface where it is smelted down.

Like U.S. Pat. No. 2,688,478, GB 882909 discloses a smelting furnace and a method for smelting down iron ore, wherein fines are introduced into the smelting furnace with the addition of oxygen and a fuel by means of a burner device mounted at the top of the smelting furnace, and the combustion products impinge directly on the surface of the molten metal bath or slag bath present in the smelting furnace and are smelted down.

WO 9815661 shows a method and an apparatus for producing liquid pig iron, wherein fine particulate iron oxide carriers are introduced into the smelting gasification zone of a smelter gasifier by means of a dust burner. Prior to introduction into the smelter gasifier, said fine particulate iron oxide carriers are reduced by means of devices assigned by the apparatus to reduce the iron oxide carriers.

The disadvantage of this is the additional equipment cost/complexity required for the devices for reducing the iron oxide carriers.

WO 02088401 describes a method for producing pig iron in the context of a COREX® process, wherein dust is removed from the export gas drawn off from a smelter gasifier, and the dust together with an oxygen-containing gas and carbonaceous material is returned to the smelter gasifier by means of a dust burner.

WO9802586 discloses a method and a device for producing liquid pig iron, wherein fine-grained and reduced iron ore or dust are introduced into the smelter gasifier by means of burners mounted in the dome region or at the level of the fluidized bed of a smelter gasifier.

WO 9748825 describes a device for producing a molten metal bath by means of a smelter gasifier, wherein partially reduced metal carriers containing fines are introduced into the smelter gasifier, wherein said metal carriers first impinge on a burner-heated collecting device which is disposed centrally in the dome region of the smelter gasifier, are partially melted thereon and then pass by gravity into the smelting gasification zone of the smelter gasifier where they are smelted down.

DE 1086256 describes a device for recovering iron from powdered i.e. fine-grained iron ores by means of fuels. Pre-reduced ore and fine dust from electrical gas cleaning are introduced through inlet nozzles into the smelting chamber together with a fuel and a combustion medium. In the space in front of the inlet nozzles, the introduced components react with one another to form liquid iron and liquid slag which mostly drip down onto the coke bed.

In the case of the above mentioned methods known from the prior art, the fine particulate material is either introduced into a smelting reduction unit where it is smelted down or introduced into a fluidized bed reduction unit after agglomeration in an agglomerating device. A significant disadvantage of the former method is that the fine particulate material is returned to the pig iron production process by introducing the fine particulate material into the smelting reduction unit. The fine particulate material has to be further reduced, i.e. reduction has to be completed, in the smelting reduction unit. However, this has an adverse effect on the smelting and/or gasification process in the smelting gasification zone of the smelting reduction unit. The returning of such fine particulate material to the pig iron production process by introducing the fine particulate material into the smelting reduction unit is therefore restricted in terms of quantity. In other words, with this method known from the prior art it is not possible for any amount of this fine particulate material to be returned to or used in the pig iron production process. The disadvantage of the latter method is that separate agglomerating devices are required. These require much space and create high additional costs.

SUMMARY OF THE INVENTION

Technical Object

The object of the present invention is to provide a method and a device, wherein a large amount of fine particulate material comprising iron-oxide-containing particles can be immediately used simply and without pre-treatment in a pig iron production process and/or direct reduction process without adversely affecting the pig iron production process.

Technical Solution

This object is achieved according to the invention by a method for introducing fine particulate material comprising iron-oxide-containing particles into a reduction unit, wherein the reduction unit is a fluidized bed reduction unit having a fluidized bed, wherein the temperature in the fluidized bed is more than 300° C., preferably more than 400° C., with particular preference more than 500° C. and less than 900° C., preferably less than 850° C., with particular preference less than 800° C., wherein the fine particulate material is introduced directly into the fluidized bed and/or into a free space above the fluidized bed by means of a burner, and wherein, while it is being introduced, the fine particulate material is formed into agglomerates, after which the agglomerates are retained in the fluidized bed of the fluidized bed reduction unit until they are removed again from the fluidized bed reduction unit.

The fine particulate material has a grain size distribution $D_{50}$, wherein introducing, e.g. blowing, the fine particulate material into the fluidized bed of the fluidized bed reduction unit involves major difficulties, particularly due to the discharge of the introduced material from the fluidized bed reduction unit with a reverse flow of reducing gas through the fluidized bed reduction unit. The fine particulate material preferably has a grain size distribution $D_{50}$ of less than 50 μm. The grain size distribution $D_{50}$ of the fine particulate material is preferably between 2 and 10 μm. The terms grain size distribution or particle size distribution $D_{50}$ denote the median of the diameters of all the particles contained in the fine particulate material. For example, $D_{50}=5$ μm means that half of the particles of the fine particulate material have a diameter of less than 5 μm and the other half of the particles of the fine particulate material have a diameter of more than 5 μm. According to the invention, the fine particulate material comprises iron-oxide-containing particles. "Comprises" is to be understood as meaning that the fine particulate material contains iron-oxide-containing particles in each case, but can additionally contain other materials. The iron-oxide-containing particles of the fine particulate material can consist of the element iron or the particles can consist of iron-containing compounds, e.g. iron oxides, iron ores or fine iron ores. In addition, the term "iron-oxide-containing particles" also covers a mixture of particles consisting of iron and particles consisting of iron-containing compounds.

According to the invention, the fine particulate material is introduced into the fluidized bed reduction unit. The iron-oxide-containing particles introduced into the fluidized bed reduction unit, in so far as these particles contain oxidic components, are reduced or partially reduced to iron intermediate products and/or iron products by means of a reducing gas preferably comprising hydrogen and/or carbon monoxide. Partially reduced means that at least some particles having oxidic components contain at least one oxygen atom less after their reduction.

The fine particulate material is introduced into the fluidized bed reduction unit by means of the burner such that the fine particulate material is introduced into the fluidized bed and/or into the free space above the fluidized bed of the fluidized bed reduction unit by means of the burner. The fine particulate material can also be introduced into the fluidized bed reduction unit if required by means of a plurality of burners distributed above the shell of the reduction unit, wherein the fine particulate material is conveyed or more specifically blown into the fluidized bed reduction unit by means of a flame issuing from the burner and/or the fine particulate material comes into contact with part of the flame issuing from the burner or interacts therewith as it is introduced into the fluidized bed reduction unit by means of the burner. If a plurality of burners is present, the quantity of fine particulate material introduced by means of a particular burner is randomly distributed and can be adapted selectively and at any time to the respective process requirements in the fluidized bed reduction unit.

Fluidized bed is to be understood as meaning a bed of fine particulate material which is placed in a fluidized state by an upward flow of a fluid, preferably by an upward flow of the reducing gas. The bed has fluid-like properties, e.g. the properties of water. A distinction is drawn between homogeneous fluidized beds having a spatially uniform distribution of the fine particulate material present in the fluidized bed unit and inhomogeneous fluidized beds having a spatially non-uniform distribution of the fine particulate material present in the fluidized bed reduction unit. Additionally known are stationary or bubbling fluidized beds in which the bed possesses a clear limit from which only a very small amount of fine particulate material is discharged. Circulating fluidized beds are fluidized beds in which the bed possesses no clear upper limit, i.e. the fine particulate material is largely discharged from the fluidized bed. Bubbling fluidized beds are approximately 20%-40% fine particulate material by volume. Located above the so-called "dense" zone of the fluidized bed, i.e. the zone in the fluidized bed reduction unit having more than 5% fine particulate material by volume, is the free space above the fluidized bed having less than 5% fine particulate material by volume. According to the invention, the fine particulate material is introduced directly into the fluidized bed and/or into the free space above the fluidized bed of the fluidized bed reduction unit.

According to the invention, the fine particulate material is formed into agglomerates while it is being introduced, after which the agglomerates are retained in the fluidized bed of the fluidized bed reduction unit until they are removed again from the fluidized bed reduction unit.

The fine particulate material is only melted at the surface by means of a flame issuing from the burner, or more specifically by means of the thermal energy transferred from the flame to the iron-oxide-containing particles and/or a gas composition present in the region of the flame which is different from the gas composition present outside the region of the flame. As a result, the individual constituents of the fine particulate material melt to form agglomerates of various sizes. These agglomerates are held in suspension by the reducing gas flowing upward through the fluidized bed reduction unit. The size of the agglomerates forming is dependent on the flame temperature. The flame temperature, or more specifically the focal spot temperature, i.e. the temperature in the immediate vicinity of the flame, is consequently adjusted such that the agglomerates are neither discharged from the fluidized bed reduction unit by the reducing gas nor sink down to the bottom of the fluidized bed reduction unit. Rather the agglomerates perform a random movement caused by the flow of reducing gas in the fluidized bed or in the free space above the fluidized bed, as the case may be—they are in a state of suspension within the fluidized bed.

The temperature in the fluidized bed or in the free space above the fluidized bed is more than 300° C., preferably more than 400° C., with particular preference more than 500° C. and less than 900° C., preferably less than 850° C., with particular preference less than 800° C. This temperature is below the melting temperature of the fine particulate material. The agglomerates are not smelted down in the fluidized bed reduction unit. The agglomerates are therefore also removed as such from the fluidized bed reduction unit.

The introduction of the fine particulate material in the form of agglomerates into the fluidized bed of the fluidized bed reduction unit results in an increase in the grain size distribution (e.g. the $D_{50}$) of the introduced fine particulate material, which is directly associated with a decrease in the amount of fine particulate material or more specifically in the amount of iron-oxide-containing particles—the valuable materials—discharged from the fluidized bed reduction unit with the reducing gas. As a result, the losses of valuable material, in particular the iron-oxide-containing particles, caused by the discharge of valuable materials from the fluidized bed reduction unit as part of a pig iron production process, e.g. a FINEX® process, can be minimized. In addition, the stability and output, corresponding to the weight of compacted units per time unit, of any compacting device downstream of the fluidized bed reduction unit for compacting the iron intermediate products and/or and or iron products produced in the fluidized bed reduction unit is increased. Moreover, this obviates the need for an agglomerating device that without the method according to the invention would otherwise be necessary for agglomerating the iron-oxide-containing particles prior to introducing them into the fluidized bed reduction unit.

In the context of a plant network in which a plurality of fluidized bed reduction units using fluidized bed processes is cascaded, the amounts of fine particulate material introduced can be distributed as required across the different fluidized bed reduction units.

The advantage of this is that, as part of a pig iron production process and/or direct reduction process, large quantities of this fine particulate material can be introduced directly and without prior treatment, such as agglomeration to agglomerates in a separate agglomerating device, for example, into the fluidized bed reduction unit or—in the case of a plant network comprising a plurality of fluidized bed reduction units—into the respective fluidized bed reduction units. In particular, this method is suitable for the return of very large quantities of unreduced and/or not completely reduced fine particulate material into the pig iron production process, but without adversely affecting the quality of the pig iron production process as in the prior art. In the prior art, the fine particulate material is usually introduced into a smelting reduction unit. However, this disadvantageously affects the smelting or more specifically gasification process in the smelting gasification zone of the smelting reduction unit.

An embodiment of the invention is characterized in that at least a partial quantity of the fine particulate material comes from a dedusting device, in particular a dry dedusting device, of a smelting reduction unit and/or a direct reduction plant.

A direct reduction plant is to be understood as meaning a system comprising at least one reduction unit which is suitable for reducing iron-oxide-containing material. A smelting reduction unit is to be understood as meaning a unit or system designed to reduce and smelt iron-oxide-containing material—e.g. a blast furnace or a FINEX® plant.

This embodiment enables fine particulate material separated by dedusting devices to be fed back into the pig iron production process. The term dedusting device encompasses in particular dry dedusting devices for cleaning offgas extracted from the fluidized bed reduction unit and/or vent gas from a compacting device, e.g. for HCI (hot compacted iron) and/or casting bay dedusting. In the case of wet dedusting devices or scrubbers, it is possible for the slurries and dusts separated during wet dedusting to be returned to the fluidized bed reduction unit as fine particulate material, possibly after drying of the separated slurries and dusts.

Another embodiment of the invention is characterized in that, at least in the case of a partial quantity of the fine particulate material comprising the iron-oxide-containing particles, at least one reaction from the group comprising the reactions a. oxidation of the iron-oxide-containing particles,
b. reduction of the iron-oxide-containing particles,
c. increase in the porosity of the iron-oxide-containing particles,
d. drying of the fine particulate material, takes place during introduction by means of the burner.

If the iron-oxide-containing particles have e.g. magnetitic components, the magnetitic components are at least partially oxidized to hematitic components if a magnetite-oxidizing gas composition is present in the region of the flame. In most cases the hematitic components are more readily reducible than the magnetitic components in the fluidized bed reduction unit.

If the iron-oxide-containing particles to be introduced into the fluidized bed reduction unit, i.e. the fine particulate material, have a high humidity unfavorable for reduction in the fluidized bed reduction unit, this is reduced during the introduction thereof. In other words, during the introduction of the iron-oxide-containing particles, i.e. of the fine particulate material, the fine particulate material is dried.

Another advantage is that during the introduction of the iron-oxide-containing particles, the porosity of the ironoxide-containing particles is increased—resulting in acceleration of the reaction process in the fluidized bed reduction unit.

Another embodiment of the invention is characterized in that the fine particulate material is pneumatically transported to the burner by means of a conveying gas.

The fine particulate material is entrained with the conveying gas i.e. propelled thereby, or blown to the burner by means of the conveying gas. The advantage resulting from the pneumatic transport of the fine particulate material is that devices carrying the fine particulate material, e.g. conveyor belts, are unnecessary and only devices at least partly enclosing the fine particulate material, e.g. pipework, are required. As a result, any loss of fine particulate material occurring during the transportation thereof is minimized or prevented.

The method is particularly preferred if the iron-oxide-containing particles comprise at least one member of the group consisting of the members magnetite particles, dust from a dedusting device, in particular a dry dedusting device, offgas dust from a dry dedusting device, dust from a compacting device, in particular a hot compacting device (hot compacted iron plant), from a briquetting device or from a hot briquetting device and metallurgical plant dusts, in particular dusts from a casting bay deduster, fine iron ores—preferably fines <200 μm.

The advantage of this is that a large proportion of the iron-oxide-containing particles accumulating in dry dedusting devices or as part of the pig iron production process can be fed back into the pig iron production process. The fine iron ores consist of fine iron ore particles. 90% to 95% of the fine iron ore particles have a diameter of less than 200 μm.

In a variant of the method according to the invention, the fine particulate material comprises carbonaceous substances and/or is transported at a temperature of more than 150° C. to the burner.

If oxygen is present in proximity to the carbonaceous substances, the carbonaceous substances are partially or completely oxidized by means of a flame produced by the burner and issuing therefrom while the fine particulate material is being introduced into the fluidized bed reduction unit. Oxidation of the fine particulate material produces carbon monoxide and carbon dioxide. Carbon monoxide is a gas with reduction potential and therefore assists in the reduction of the iron-oxide-containing substances present in the fluidized bed reduction unit.

The advantage of this is that less reducing gas or none at all from another source, e.g. from a smelting reduction unit, needs to be supplied to the fluidized bed reduction unit.

If the temperature of the fine particulate material is more than 150° C.—so-called hot fines—the material is preferably transported by means of a hot conveying device. If the fine particulate material is already present as hot fines prior to being transported to the burner, it can be transported in the hot state to the burner without prior cooling. This has the advantage of increasing the energy efficiency, as the thermal energy which must be supplied to the fine particulate material e.g. in the burner or in the fluidized bed reduction unit for carrying out the method according to the invention is reduced.

An embodiment of the method according to the invention is characterized in that the burner is operated using a gaseous fuel and/or a liquid fuel and/or a solid fuel and/or using an oxygen-containing gas, wherein for operation of the burner using fuel, the gaseous fuel and/or the solid fuel comprises at least one member of the group consisting of: product gas from a $CO_2$ removal device, tail gas from a $CO_2$ removal device, cooling gas, export gas, top gas, offgas, coke oven gas, natural gas, pressure-liquefied gas, gas from biomass gasification, carbonaceous and/or hydrogen-containing gas, and solid carbon carriers and/or solid hydrocarbon carriers.

The advantage of this is that both the process gases associated with a pig iron production process, which would normally have to undergo expensive treatment before being released into the environment, can inventively be used as fuel for the burner, thereby increasing the energy efficiency of the pig iron production process. If such process gases are absent or not present in sufficient quantity, all conventional gaseous and solid fuels, as well as oxygen-containing gas can be supplied to the burner.

Another embodiment of the method according to the invention is characterized in that, after exiting the burner, the gaseous fuel and/or the solid fuel is at least partially oxidized with an oxygen-containing gas and the oxygen-containing gas comprises at least one member of the group consisting of air, oxygen, nitrogen and steam.

The fuel supplied to the burner is combusted with the addition of the oxygen-containing gas to produce thermal energy and a flame. The stoichiometric ratio of oxygen-containing gas to fuel can be selected such that excess oxygen is present, the oxygen of the oxygen-containing gases not being completely consumed during combustion. This produces a so-called "oxidizing flame" which, if the iron-oxide-containing particles have magnetitic components, at least partially converts or more specifically oxidizes said magnetitic components to hematitic components during introduction of the material into the fluidized bed reduction unit. This has the advantage of a more efficient reaction process in the fluidized bed reduction unit, as hematite is easier to reduce than magnetite.

Conversely, the burner can also be operated using a "reducing flame", wherein the oxygen-containing gas is substoichiometrically admixed with the fuel. The magnetite is at least partially reduced by the "reducing flame" while being introduced into the fluidized bed reduction unit, which can likewise positively affect the subsequent reduction process in the fluidized bed reduction unit.

A particularly preferred embodiment of the method according to the invention is characterized in that, if the burner is operated solely using the oxygen-containing gas, the oxygen-containing gas is reacted with a gas atmosphere comprising hydrogen and/or carbon monoxide and/or methane and/or hydrocarbons in the fluidized bed reduction unit.

At least a partial quantity of the hydrogen and/or carbon monoxide and/or methane and/or hydrocarbon components of the gas atmosphere of the fluidized bed reduction unit that are present in the immediate vicinity of the flame burning into the fluidized bed reduction unit are combusted/oxidized together with the oxygen of the oxygen-containing gases. The advantage of this is that the burner can also be operated if necessary without externally supplied fuel. The hydrocarbons are, for example, ethane or propane or gas mixtures comprising ethane and propane.

If the gas atmosphere of the fluidized bed reduction unit comprises oxygen-containing gas, another embodiment of the present invention is characterized in that the fuel fed to the burner is combusted/oxidized with the oxygen present in the gas atmosphere of the fluidized bed reduction unit. At least a partial quantity of the oxygen of the gas atmosphere of the fluidized bed reduction unit present in the immediate vicinity of the flame burning into the fluidized bed reduction unit is combusted with the fuel supplied to the burner. The advantage of this is that the burner can also be operated if necessary without an externally supplied oxygen-containing gas.

An embodiment of the method according to the invention is characterized in that the solid fuel is transported into the burner by means of the conveying gas, wherein the conveying gas comprises at least one member of the group consisting of: product gas from a $CO_2$ removal device, tail gas from a $CO_2$ removal device, cooling gas, export gas, top gas, offgas, coke oven gas, natural gas, gas from biomass gasification, carbonaceous and/or hydrogen-containing gas, air, oxygen, nitrogen and steam.

Another embodiment of the method according to the invention is characterized in that at least a partial quantity of the gaseous fuel and/or at least a partial quantity of the oxygen-containing gas is used as conveying gas pneumatically transporting the fine particulate material to the burner.

Another embodiment of the method according to the invention is characterized in that at least one solid material is supplied to the burner, in particular carbon and/or hydrocarbon carriers such as fine coke and/or fine coal, which is introduced into the fluidized bed reduction unit in addition to the fine particulate material comprising the iron-oxide-containing particles by means of the burner.

The solid material is supplied to the burner separately from the iron-oxide-containing particles. The solid material is present in fine particulate form. Both the solid material and the fine particulate material are supplied to the burner in metered amounts or are introduced therefrom into the fluidized bed reduction unit in metered amounts. The expression "in metered amounts" is to be understood as meaning a variable amount of fine particulate material and/or solid material supplied to the burner or introduced by means of the burner into the fluidized bed reduction unit per unit time.

In addition to control via the burner output and, during operation of the burner using fuel, in addition to control via the ratio of the oxygen-containing gases to fuel, supplying the solid material or solid materials in metered amounts enables the focal spot temperature to be adjusted in a defined range. Focal spot temperature is to be understood as meaning the temperature in the immediate vicinity of the flame issuing from the burner. Burner output is to be understood as meaning the energy, in particular thermal energy, introduced into the fluidized bed reduction unit by means of the burner per unit time. If the focal spot temperature is comparatively high, the iron-oxide-containing particles introduced into the fluidized bed reduction unit by means of the burner are agglomerated in the flame emerging from the burner as they are introduced to form agglomerates which can be fluidized in the fluidized bed of the fluidized bed reduction unit. However, if the focal spot temperature is too high, excessively large agglomerates are produced which can no longer be fluidized in the fluidized bed. In some cases the particles constituting the fluidized bed also agglomerate to excessively large agglomerates which can no longer be fluidized in the fluidized bed. The formation of these excessively large agglomerates may cause the fluidized bed to fail due to defluidizing of the fluidized bed—the agglomerates can no longer be fluidized in the fluidized bed. In these circumstances the fluidized bed can no longer be maintained. On the other hand, if the focal spot temperature is low, no agglomeration or only minimal agglomeration of the iron-oxide-containing particles into agglomerates takes place during the introduction of the iron-oxide-containing particles into the fluidized bed reduction unit by means of the burner. If the grain sizes of the introduced iron-oxide-containing particles, or more specifically of the agglomerates formed, are correspondingly small, they are discharged again from the fluidized bed reduction unit immediately after having been introduced thereinto. The focal spot temperature for the purpose of agglomeration is set such that, on the one hand, the discharge of iron-oxide-containing particles from the fluidized bed reduction unit is minimal and, on the other, maintenance of the fluidized bed in the fluidized bed reduction unit is ensured.

In a variant, the focal spot temperature is adjusted or controlled via the amount of fine particulate material or rather iron-oxide-containing particles contained therein introduced into the fluidized bed reduction unit by means of the burner per unit time.

Another embodiment of the method according to the invention is characterized in that, before being introduced into the fluidized bed and/or into the free space above the fluidized bed, the fine particulate material is collected in a storage device and then possibly fed to a pressure adjusting device assigned to the storage device.

The pressure adjusting device can in particular be implemented as a "lock hopper system" or as a "dispensing vessel". The advantage of collecting the fine particulate material in the storage device is that, even in the event of discontinuous conveying of the fine particulate material into the storage device, it is possible for the fine particulate material to be continuously introduced into the fluidized bed and/or into the free space above the fluidized bed. In other words, it turns a discontinuous process into a continuous process.

In addition, the pressure adjusting device assigned to the storage device ensures that the fine particulate material is reliably conveyed into the burner even in the event of variations in the pressure of the gas atmosphere in the reduction reactor, as the pressure of the gas atmosphere surrounding the fine particulate material can be matched to the pressure of the gas atmosphere in the fluidized bed reduction unit.

The gas atmosphere surrounding the fine particulate material can be an inert gas, for example, in particular a gas comprising nitrogen, or a reducing gas, in particular a hydrogen- and carbon-monoxide-containing gas.

The present invention further relates to the use of a device, comprising at least one reduction unit, wherein at least one burner having a material supply pipe for feeding fine particulate material comprising iron-oxide-containing particles into the burner is present, the reduction unit is a fluidized bed reduction unit, the burner extends into the interior of the fluidized bed reduction unit, said burner having an introduction pipe for introducing the fine particulate material into the interior of the fluidized bed reduction unit, for carrying out the method according to the invention.

If a plurality of fluidized bed reduction units is present, a plurality of burners for supplying the material comprising iron-oxide-containing particles can also be present. Said burners are disposed such that fine particulate material can be introduced directly into the fluidized bed and/or into the free space above the fluidized bed of the fluidized bed reduction unit. For example, for each fluidized bed reduction unit a first burner is present for introducing the fine particulate material directly into the fluidized bed and a second burner is present for introducing the fine particulate material directly into the free space above the fluidized bed of the fluidized bed reduction unit. The burners can be disposed at any points on the shell of the fluidized bed reduction unit. In the case of a plant network, in particular a FINEX® plant network comprising a plurality of cascaded fluidized bed reduction units, one or more burners for introducing the fine particulate material into the respective fluidized bed reduction unit can be present for each fluidized bed reduction unit, but it is also possible for a burner to be present only for some fluidized bed reduction units.

The burner comprises a gas supply pipe for feeding oxygen-containing gas and/or a fuel supply pipe for feeding gaseous and/or liquid and/or solid fuels into the burner.

A dry dedusting device for dedusting gas, in particular offgas from the at least one fluidized bed reduction unit is assigned to the at least one fluidized bed reduction unit.

The dust-laden offgas from the at least one fluidized bed reduction unit is withdrawn therefrom and is dedusted by means of a dry dedusting device, e.g. by means of hot gas filters, or is dedusted in the cold state by means of normal dedusting filters in the event that the offgas passes through a heat exchanging device after being removed from the fluidized bed reduction unit.

A material supply pipe—for supplying the fine particulate material comprising iron-oxide-containing particles—emerges from at least one storage device for storing the fine particulate material.

A solid material supply pipe leading into the burner and/or into the gas supply pipe and/or into the fuel supply pipe is present for feeding solid material into the burner and/or for feeding the solid material into the gas supply pipe and/or for feeding the solid material into the fuel supply pipe.

A pressure adjusting device for setting the pressure of the gas atmosphere surrounding the fine particulate material is assigned to the storage device.

A suitable pressure adjusting device is for example a "lock hopper system" or a "dispensing vessel". The pressure of the gas atmosphere surrounding the fine particulate material is brought to a higher pressure than the pressure in the fluidized bed reduction unit prior to the introduction of the fine particulate material into the burner, i.e. prior to the introduction of the fine particulate material into the fluidized bed reduction unit, making it possible for the fine particulate material to be conveyed into the fluidized bed reduction unit.

A pneumatic conveying device is present for pneumatically conveying the fine particulate material into the burner.

The oxygen-containing gas can be fed to the burner by means of the material supply pipe.

The fine particulate material and the oxygen-containing gas are introduced into the burner by means of the material supply pipe and into the interior of the fluidized bed reduction unit by means of the introduction pipe.

The invention also relates to the use of the method according to the invention for producing liquid pig iron or liquid steel intermediate products by means of a smelting reduction process in a smelting reduction plant, wherein fine particulate material is inventively introduced into a fluidized bed reduction unit and the fine particulate material, possibly with the addition of additives and fine particulate iron-oxide-containing feedstocks, is at least partially reduced in the fluidized bed reduction unit by means of a reducing gas to produce iron intermediate products, and the iron intermediate products are smelted in a smelting reduction unit, with the addition of an oxygen-containing gas and carbonaceous energy carriers, to produce liquid pig iron or liquid steel intermediate products with formation of the reducing gas.

Iron intermediate products are products produced in the fluidized bed reduction unit which are melted in a unit, e.g. in a smelting reduction unit which together with the fluidized bed reduction unit forms a plant network, to produce liquid pig iron or liquid steel intermediate products. The iron intermediate products are e.g. sponge iron and/or DRI (direct reduced iron) and are possibly compacted into briquettes, hot compacted iron (HCI) or cold or hot briquetted iron (CBI, HBI) prior to use in the smelting reduction unit. The carbonaceous energy carriers introduced into the smelting reduction unit are e.g. coal briquettes and/or lump coal and/or coke and/or hydrocarbon-containing solid, liquid or gaseous substances and/or coal fines and/or plastic material and/or heavy oil and/or natural gas.

The invention relates to the use of the method according to the invention for producing iron products by means of a direct reduction process in a direct reduction plant, wherein fine particulate material is inventively introduced into a reduction unit and the fine particulate material, possibly with the addition of additives and fine particulate iron-oxide-containing feedstocks, is at least partially reduced in the reduction unit by means of a reducing gas to produce iron products.

After being produced in the reduction unit, the iron products undergo further briquetting. For example, the briquetting takes the form of cold or hot briquetting of the iron products into cold or hot briquetted iron (CBI, HBI) or of hot compacting into hot compacted iron (HCI).

Iron products are products which are sold, for example, for further processing—but also further processed into steel in an associated steelworks, e.g. using an electric arc furnace.

BRIEF DESCRIPTION OF THE DRAWINGS

The invention will now be explained using examples with reference to the accompanying drawings.

FIG. 3 schematically illustrates by way of example, supplemental to FIG. 1 and FIG. 2, a section of the method according to the invention and of the device according to the invention in a FINEX®—plant network, comprising a representation of different sources of origin of the gaseous fuel, the conveying gas and the fine particulate material.

DESCRIPTION OF THE EMBODIMENT

Figure 1:
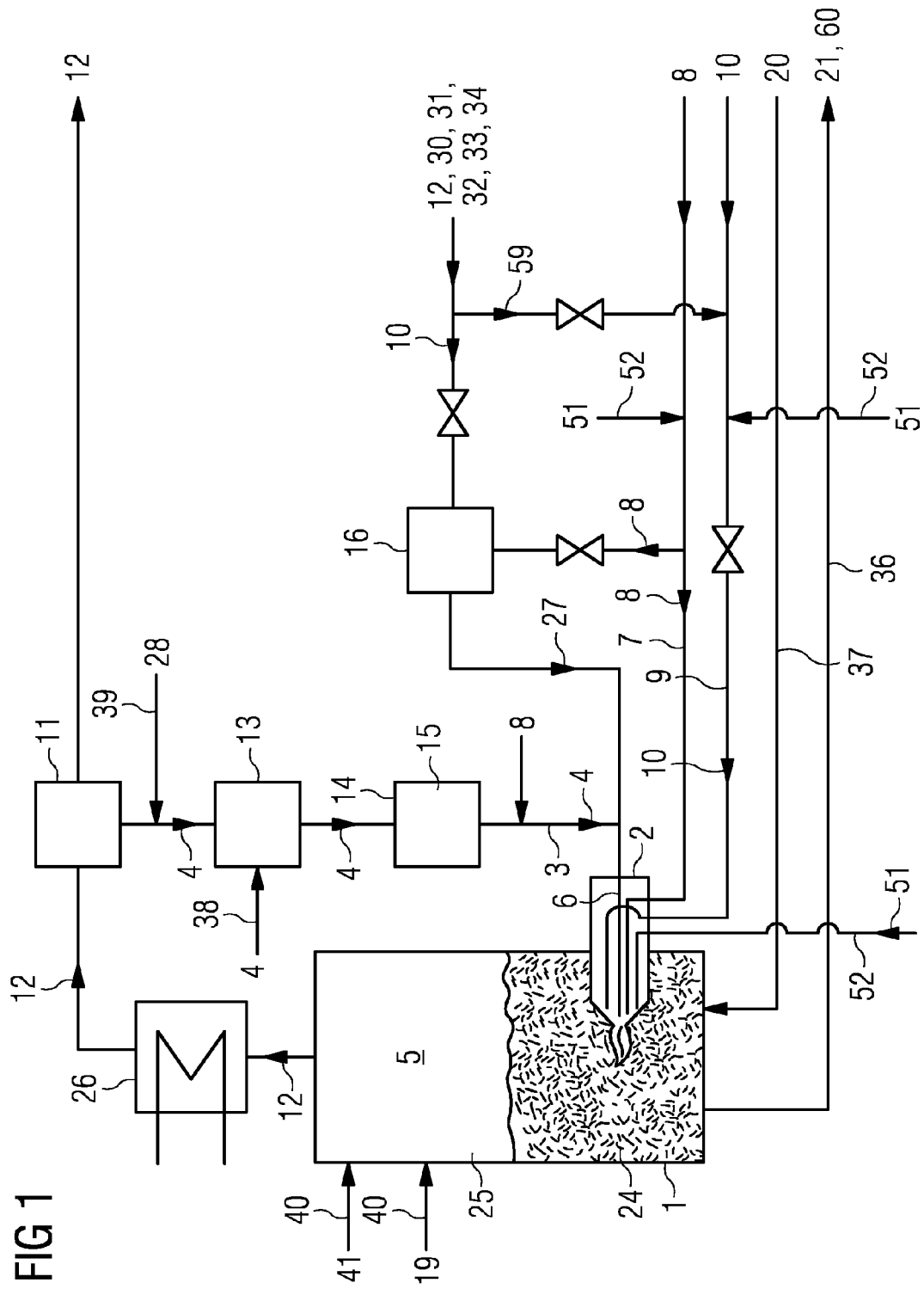
FIG. 1 schematically illustrates by way of example a method according to the invention and a device according to the invention comprising a fluidized bed reduction unit.

FIG. 1 schematically illustrates an example of the method according to the invention and the device according to the invention, wherein fine particulate material (4) comprising iron-oxide-containing particles is introduced into the fluidized bed (24) of a fluidized bed reduction unit (1) by means of a burner (2). The temperature in the fluidized bed (24) is more than 300° C., preferably more than 400° C., with particular preference more than 500° C. and less than 900° C., preferably less than 850° C., with particular preference less than 800° C. The fine particulate material (4) is conveyed via a material supply pipe (3) to the burner (2) where it is introduced into the interior (5) of the fluidized bed reduction unit (1) by means of an introduction pipe (6) disposed in the burner (2). While it is being introduced, the fine particulate material (4) is formed into agglomerates. The agglomerates are then retained in the fluidized bed (24) of the fluidized bed reduction unit (1) until they are removed again from the fluidized bed reduction unit (1). Fine particulate iron-oxide-containing feedstocks (41) as well as additives (19) are additionally charged into the interior (5) of the fluidized bed reduction unit (1) via the transporting pipes (40). By means of a reducing gas (20) introduced via a reducing gas pipe (37) into the interior (5) of the fluidized bed reduction unit (1), or more specifically into the fluidized bed (24) of the fluidized bed reduction unit (1), the iron-oxide-containing particles contained in the fine particulate material (4) and the fine particulate iron-oxide-containing feedstocks (41) are reduced to iron intermediate products (21) and/or iron products (60) which are removed from the fluidized bed reduction unit (1) via a discharge pipe (36). The agglomerates are held in suspension by the reducing gas (20) flowing upward through the fluidized bed reduction unit (1). The size of the agglomerates forming is dependent on the flame temperature. The flame temperature, or more specifically the focal spot temperature, i.e. the temperature in the immediate vicinity of the flame, is consequently adjusted such that the agglomerates are neither discharged from the fluidized bed reduction unit (1) by the reducing gas (20) nor sink down to the bottom of the fluidized bed reduction unit (1). Rather the agglomerates perform, in the fluidized bed (24) or in the free space (25) above the fluidized bed (24), a random motion caused by the reducing gas stream, that is, they are held in suspension within the fluidized bed (24). The iron-oxide-containing particles comprise, for example, magnetite particles, dust from a dedusting device, in particular from a dry dedusting device (11), dust from a dry dedusting device (48) shown in FIG. 3 assigned to a compacting device (29) shown in FIG. 3, in particular from a hot compacting device (hot compacted iron plant), dust from a briquetting device or dust from a hot briquetting device or metallurgical plant dusts, in particular dusts from a casting bay deduster or dust from a dry dedusting device (49) shown in FIG. 3 for dedusting a reducing gas (20) which is withdrawn from a smelting reduction unit (22) shown in FIG. 3. The reducing gas (20) consumed in the reduction of the iron-oxide-containing particles contained in the fine particulate material (4) and of the fine particulate iron-oxide-containing feedstocks (41) is drawn off from the fluidized bed reduction unit (1) as a dust-laden offgas (12) and undergoes a heat exchange in the heat exchanging device (26), wherein the offgas (12) is cooled down. The dust-laden and cooled offgas (12) is then dedusted in the dry dedusting device (11), wherein fine particulate material (4) entrained with the offgas (12) is separated out. The separated fine particulate material (4) is temporarily stored in a storage device (13). Leading into the storage device (13) is a dust supply pipe (38) for supplying the fine particulate material (4) which comes, for example, from one or more of the above mentioned sources or, separated out, from scrubbers (45, 46, 47) shown in FIG. 3, and is supplied, if necessary after drying, to the storage device (13) as fine particulate material (4) via the dust supply pipe (38). Carbonaceous substances (28) are possibly admixed with the fine particulate material (4) by means of a supply pipe (39). The admixing of the carbonaceous substances (28) can take place upstream, in or downstream of the storage device (13). The storage device (13) is assigned a pressure adjusting device (14) for adjusting the pressure of the gas atmosphere (15) surrounding the fine particulate material (4). For example, if the pressure in the fluidized bed reduction unit (1) is higher than the gas atmosphere (15) surrounding the fine particulate material (4), the pressure of the gas atmosphere (15) in the pressure adjusting device (14) is increased by means of the pressure adjusting device (14) to a value exceeding the pressure in the fluidized bed reduction unit (1) before the fine particulate material (4) is conveyed pneumatically by means of the pneumatic conveying device (16) from the pressure adjusting device (14) via the material supply pipe (3) to the burner (2). The fine particulate material is conveyed or more specifically blown or sucked along with a conveying gas (27) coming from the pneumatic conveying device (16). The burner (2) is connected to the material supply pipe (3) which leads into the introduction pipe (6) for introducing the fine particulate material (4) into the interior (5) of the fluidized bed reduction unit (1). The burner (2) additionally has a gas supply pipe (7) for supplying an oxygen-containing gas (8), preferably air, technical oxygen, nitrogen or steam, and a fuel supply pipe (9) for feeding gaseous and/or liquid and/or solid fuels (10) into the burner (2). The burner (2) also has a solid material supply pipe (52) for supplying solid material (51), in particular for feeding solid iron carriers into the burner (2). The solid material supply pipe (52) additionally leads into the gas supply pipe (7) and into the fuel supply pipe (9). The burner (2) is designed such that the oxygen-containing gas (8), the fuel (10), the fine particulate material (4) introduced into the burner (2) via the introduction pipe (6) and the solid material (51) can be mixed in—or at—the tip of the burner (2) leading into the interior (5) of the fluidized bed reduction unit (1). After ignition of this mixture, a flame extending out of the burner mouth is formed by which the fine particulate material (4) is introduced into the interior (5) of the fluidized bed reduction unit.

Figure 2:
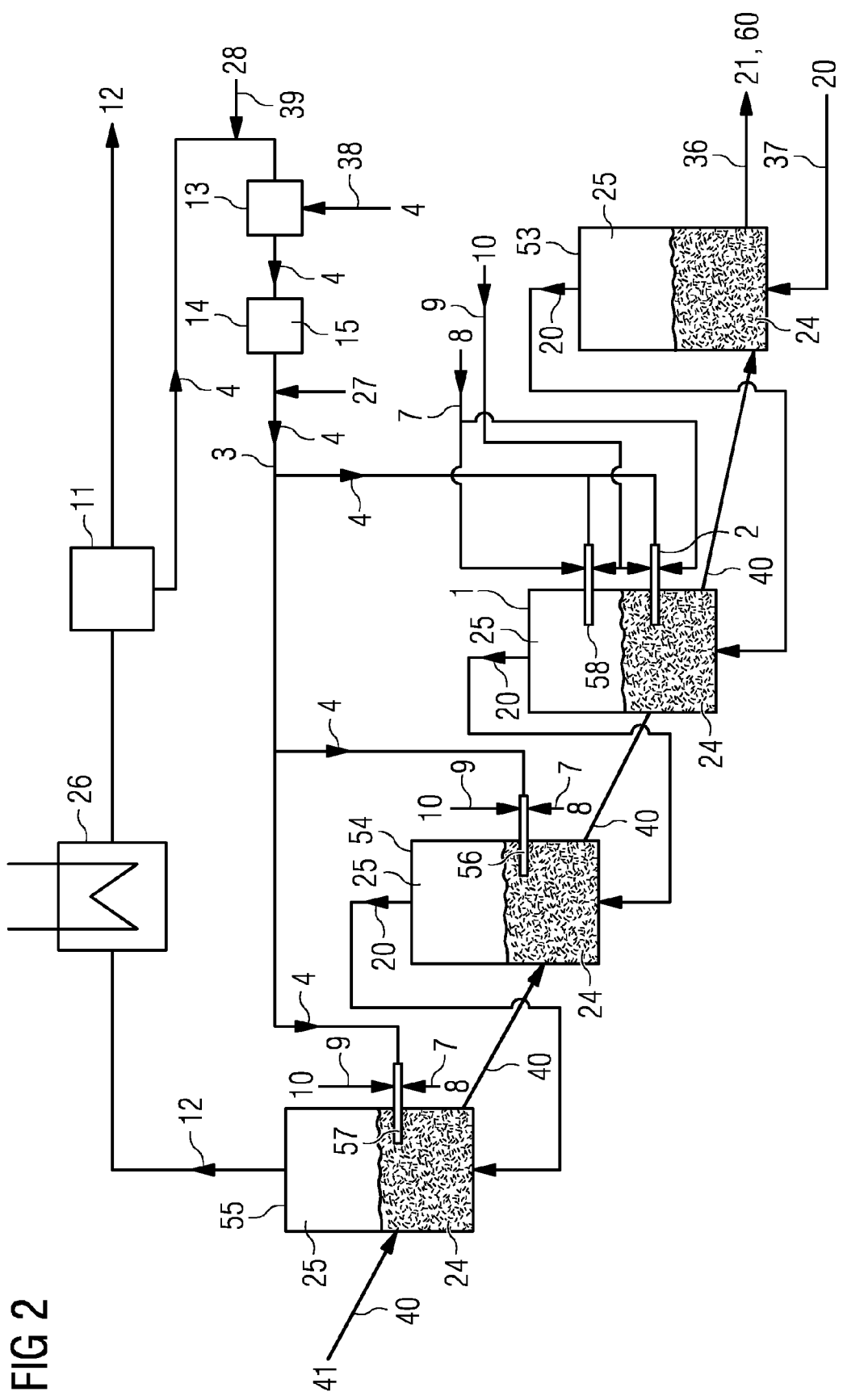
FIG. 2 schematically illustrates by way of example a specific embodiment of the method according to the invention and of the device according to the invention comprising a plurality of fluidized bed reduction units.

If the fuel (10) is solid fuel (10), e.g. fine particulate carbonaceous material, the solid fuel (10) is transported into the burner (2) by means of the conveying gas (59). If a gaseous fuel (10) is used, the fuel (10) can be used directly as conveying gas (27) for pneumatically conveying the fine particulate material (4) into the burner (2). Said gaseous fuel (10) is fed directly to the pneumatic conveying device (16). In a specific embodiment of the invention, at least a partial quantity of the oxygen-containing gas (8) is used as conveying gas (27), wherein a partial quantity of the oxygen-containing gas (8) is fed to the pneumatic conveying device (16). A possible fuel (10) or conveying gas (27) is, for example, offgas (12), product gas (30), tail gas (31), cooling gas (32), export gas (33), top gas (34) or vent gas (50). These gases are fed to the burner by means of the fuel supply pipe (9). These gases can also be fed to the pneumatic conveying device (16). FIG. 2 schematically illustrates by way of example a specific embodiment of the method according to the invention and of the device according to the invention comprising a plurality of fluidized bed reduction units.

This embodiment comprises 4 fluidized bed reduction units (1,53,54,55) each having a fluidized bed (25), wherein the reducing gas (20) is first introduced into the fluidized bed reduction unit (53) via the reducing gas pipe (37). After reduction of the fine particulate iron-oxide-containing feedstocks (41) introduced into the fluidized bed reduction unit (53) via the transporting pipe (40) and of the fine particulate material (4) comprising iron-oxide-containing particles that is present in the fluidized bed reduction unit (53) to produce iron intermediate products (21) and/or iron products (60), the iron intermediate products (21) and/or iron products (60) are removed from the fluidized bed reduction unit (53) by means of the discharge pipe (36) and possibly supplied to further processing stages. The reducing gas (20) partially consumed during reduction in the fluidized bed reduction unit (53) is withdrawn therefrom and introduced into the fluidized bed reduction unit (1). In said fluidized bed reduction unit (1), the fine particulate material (4) introduced via the burners (2, 58) into the fluidized bed (24) or into the free space (25) above the fluidized bed (24) and the fine particulate iron-oxide-containing feedstocks (41) are reduced by means of the partially consumed reducing gas (20) withdrawn from the fluidized bed reduction unit (53), wherein part of the reducing gas (20) is again consumed and withdrawn from the fluidized bed reduction unit (1). After introduction of the reducing gas (20) into the fluidized bed reduction units (54) and (55) in which the fine particulate material (4) introduced by means of the thereto assigned burners (56) and (57) and the fine particulate iron-oxide-containing feedstocks (41) introduced via the transporting pipe (40) are reduced, the reducing gas (20) is withdrawn from the fluidized bed reduction unit (55) as offgas (12). The material flow direction of the fine particulate iron-oxide-containing feedstocks (41) and of the reducing gas (20) is reversed in the method shown in FIG. 3—the FINEX® process. Whereas on leaving the fluidized bed reduction unit (53) the reducing gas (20) flows though the fluidized bed reduction units (1), (54) and (55) one after the other, the reduced fine particulate iron-oxide-containing feedstocks (41) and the reduced iron-oxide-containing particles contained in the fine particulate material are transported in the opposite direction by means of the transporting pipe (40) in order to be ultimately discharged from the fluidized bed reduction unit (53) as iron intermediate products (21) and/or iron intermediate products (60) via the discharge pipe (36). The features not described here and shown in FIG. 2 correspond to the features described in connection with FIG. 1.

Supplemental to FIGS. 1 and 2, FIG. 3 schematically illustrates by way of example different sources of origin of the gaseous fuel (10), of the conveying gas (27) and of the fine particulate material (4).

Prior to use in a smelting reduction unit (22), the iron intermediate products (21) discharged as DRI from the fluidized bed reduction unit (53) via the discharge pipe (36) shown in FIG. 2 are re-formed by means of a compacting device (29) into HCI (43)—hot compacted iron—or into briquettes (44) which are charged into the smelting reduction unit (22) via the charging device (42). There, with the addition of an oxygen-containing gas (8) and carbonaceous energy carriers (23), e.g. lump coal, the HCI (43) or briquettes (44) is/are melted down into liquid pig iron (17) or liquid steel intermediate products (18) with formation of the reducing gas (20) and discharged from the smelting reduction unit (22). The dust-laden reducing gas (20) withdrawn from the smelting reduction unit (22) is dedusted in the dry dedusting device (49) and a first partial quantity of the dedusted reducing gas (20) is introduced into the charging device (42) in order to prevent reoxidation of the iron intermediate products (21) introduced into the charging device (42). The first partial quantity of the dedusted reducing gas (20) introduced into the charging device (42) is withdrawn therefrom as top gas (34) and possibly fed to a $CO_2$ removal device (35) after wet cleaning in the scrubber (47). A second portion of the dedusted reducing gas (20) undergoes wet cleaning in the scrubber (46) while preserving the cooling gas (32) before it is mixed with the reducing gas (20) withdrawn from the smelting reduction unit (22) prior to the dedusting thereof in the dry dedusting device (49). A third partial quantity of the dedusted reducing gas (20) is fed back into at least one of the fluidized bed reduction units (53,1,54,55) shown in FIG. 2, while a fourth partial quantity of the dedusted reducing gas (20) undergoes wet cleaning in the scrubber (45).

After cleaning in the dry dedusting device (11), a first partial quantity of the offgas (12) which is withdrawn from the fluidized bed reduction unit (55) shown in FIG. 2 undergoes $CO_2$ removal in the $CO_2$ removal device (35) with the formation of a low-$CO_2$ product gas (30) and a high-$CO_2$ tail gas (31). The second partial quantity of the offgas (12) withdrawn from the fluidized bed reduction unit (55) leaves the FINEX® plant network without prior $CO_2$ removal as an export gas (33). The product gas (30) is mixed with the dust-laden reducing gas (20) withdrawn from the smelting reduction unit (22) prior to the dedusting thereof in the dry dedusting device (49). For example, the product gas (30), the tail gas (31), the cooling gas (32), the export gas (33), the top gas (34), and the offgas (12) are used at least in part both as gaseous fuel (10) and as conveying gas (27). The fine particulate material (4) separated during dedusting of the vent gas (50) in the dry dedusting device (48) or during dedusting of the reducing gas (20) withdrawn from the smelting reduction unit (22) in the dry dedusting device (49) is fed e.g. by means of the dust supply pipe (38) to the storage device (13). The sludges separated in the scrubbers (45), (46) and (47) are possibly, if required after the drying thereof, likewise fed to the storage device (13) as fine particulate material (4) via the dust supply pipe (38).

Although the invention has been illustrated and described in detail by the preferred exemplary embodiments, the invention is not limited by the examples disclosed and other variations may be inferred by the average person skilled in the art without departing from the scope of protection sought for the invention.

LIST OF REFERENCE CHARACTERS 1 fluidized bed reduction unit
2 burner
3 material supply pipe
4 fine particulate material
5 interior
6 introduction pipe
7 gas supply pipe
8 oxygen-containing gas
9 fuel supply pipe
10 fuel
11 dry dedusting device
12 offgas
13 storage device
14 pressure adjusting device
15 gas atmosphere
16 pneumatic conveying device
17 liquid pig iron
18 liquid steel intermediate products
19 additives
20 reducing gas
21 iron intermediate products
22 smelting reduction unit
23 carbonaceous energy carrier
24 fluidized bed
25 free space
26 heat exchanging device
27 conveying gas
28 carbonaceous substances
29 compacting device
30 product gas
31 tail gas
32 cooling gas
33 export gas
34 top gas
35 $CO_2$ removal device
36 discharge pipe
37 reducing gas pipe
38 dust supply pipe
39 supply pipe 40 transporting pipe
41 fine particulate iron-oxide-containing feedstocks
42 charging device
43 HCI (hot compacted iron)
44 briquettes
45 scrubber
46 scrubber
47 scrubber
48 dry dedusting device
49 dry dedusting device
50 vent gas
51 solid material
52 solid material supply pipe
53 fluidized bed reduction unit
54 fluidized bed reduction unit
55 fluidized bed reduction unit
56 burner
57 burner
58 burner
59 conveying gas
60 iron products

The invention claimed is:

1. A method for introducing a fine particulate material comprising iron-oxide-containing particles into a reduction unit for reducing the iron-oxide-containing particles by an externally supplied reduction gas wherein the reduction unit is a fluidized bed reduction unit having a fluidized bed;
the method comprising:
providing a temperature in the fluidized bed below a melting temperature of the fine particulate material, wherein the temperature is more than 300° C. and less than 900° C.;
melting exterior surfaces of particles of the fine particulate material by using flame issuing from a burner to form the fine particulate material into agglomerates while introducing the fine particulate material directly into the fluidized bed and/or into a free space above the fluidized bed by use of a burner;
holding the agglomerates in suspension by causing the reduction gas to flow upward through the fluidized bed reduction unit for reducing the iron-oxide-containing particles contained in the agglomerates by means of the reduction gas, and removing the agglomerates from the fluidized bed reduction unit after the reduction of the iron-oxide-containing particles contained in the agglomerates.

2. The method as claimed in claim 1, further comprising obtaining at least a partial quantity of the fine particulate material from a dedusting device, a dry dedusting device, a smelting reduction unit and/or a direct reduction plant.

3. The method as claimed in claim 1, wherein at least a partial quantity of the fine particulate material comprises the iron-oxide-containing particles;
the method further comprising increasing porosity of the iron-oxide-containing particles during introduction of the particles and/or the particulate material by means of the burner.

4. The method as claimed in claim 1, further comprising pneumatically transporting the fine particulate material to the burner by means of a conveying gas.

5. The method as claimed in claim 1, wherein the iron-oxide-containing particles comprise fine iron ores.

6. The method as claimed in claim 1, wherein the fine particulate material comprises carbonaceous substances and/or is transported to the burner at a temperature of more than 150° C.

7. The method as claimed in claim 1, further comprising operating the burner using at least one of a gaseous fuel, a liquid fuel, a solid fuel, and an oxygen-containing gas.

8. The method as claimed in claim 7, further comprising during operation of the burner solely using the oxygen-containing gas, by reacting the oxygen-containing gas with a gas atmosphere comprising at least one of hydrogen, carbon monoxide, methane, and hydrocarbons in the reduction unit.

9. The method as claimed in claim 7, wherein for operating the burner with the fuel, the gaseous fuel comprises at least one process gas associated with a pig iron production process.

10. The method as claimed in claim 9, further comprising after exiting the burner, at least partially oxidizing the gaseous fuel and/or the solid fuel with an oxygen-containing gas.

11. The method as claimed in claim 10, further comprising using at least a partial quantity of the gaseous fuel and/or at least a partial quantity of the oxygen-containing gas as conveying gas for pneumatically transporting the fine particulate material into the burner.

12. The method as claimed in claim 9, further comprising transporting the solid fuel into the burner by a conveying gas, wherein the conveying gas comprises at least one process gas associated with a pig iron production process.

13. The method as claimed in claim 1, further comprising feeding at least one solid material of carbon and/or a hydrocarbon carrier to the burner, and introducing the solid material by means of the burner into the reduction unit, in addition to the fine particulate material comprising the iron-oxide-containing particles.

14. The method as claimed in claim 13, wherein the hydrocarbon carrier comprises fine coke and/or fine coal.

15. The method as claimed in claim 1, further comprising before the introducing into the fluidized bed and/or into the free space above the fluidized bed, collecting the fine particulate material in a storage device.

16. The method as claimed in claim 15, further comprising, after the collecting in the storage device, subsequently feeding the fine particulate material to a pressure adjusting device assigned to the storage device.

17. The method as claimed in claim 1, for producing liquid pig iron or liquid steel intermediate products comprising:
performing a smelting reduction process in a smelting reduction unit, wherein the process comprises introducing fine particulate material into the reduction unit, and the unit is implemented as a fluidized bed reduction unit having a fluidized bed;
at least partially reducing the fine particulate material in the fluidized bed reduction unit by means of a reducing gas to produce iron intermediate products; and
smelting the iron intermediate products in a smelting reduction unit while adding an oxygen-containing gas and carbonaceous energy carriers to produce liquid pig iron or liquid steel intermediate products along with formation of the reducing gas.

18. The method as claimed in claim 17, further comprising the at least partial reduction of the fine particulate material is performed with the addition of additives and fine particulate iron-oxide-containing feedstocks.

19. The method as claimed in claim 1, wherein at least a partial quantity of fine particulate material comprises the iron-oxide-containing particles;

the method further comprising drying the fine particulate material during introduction of the particles and/or the particulate material by means of the burner.

\* \* \* \* \*